United States Patent
Schmidt (10) Patent No.: US 9,846,057 B2
(45) Date of Patent: Dec. 19, 2017

(54) METHOD AND APPARATUS FOR COMPUTING AN ANGLE OF ROTATION

(71) Applicant: TDK-Micronas GmbH, Freiburg (DE)

(72) Inventor: Lothar Schmidt, Erbach (DE)

(73) Assignee: TDK—Micronas GmbH, Freiburg (DE)

( * ) Notice: Subject to any disclaimer, the term of this patent is extended or adjusted under 35 U.S.C. 154(b) by 0 days.

(21) Appl. No.: 15/209,693

(22) Filed: Jul. 13, 2016

(65) Prior Publication Data

US 2017/0016744 A1  Jan. 19, 2017

(30) Foreign Application Priority Data

Jul. 14, 2015 (DE) .................. 10 2015 111 404

(51) Int. Cl.
 *G01B 7/30* (2006.01)
 *G01R 33/07* (2006.01)
 *G01D 5/14* (2006.01)

(52) U.S. Cl.
 CPC ............. *G01D 5/142* (2013.01); *G01D 5/145* (2013.01)

(58) Field of Classification Search
 CPC .................... G01R 33/07; G01B 7/30
 USPC ................................................ 324/207.25
 See application file for complete search history.

(56) References Cited

U.S. PATENT DOCUMENTS

2015/0019152 A1   1/2015   Scheibenzuber

FOREIGN PATENT DOCUMENTS

DE       102 60 862 A1       7/2004
DE    10 2010 031813         9/2011

OTHER PUBLICATIONS

Wagner et al., DE102010031813A1, English Translation, Sep. 15, 2011.*
Steinlechner, DE10260862A1, English Translation, Jul. 15, 2004.*

* cited by examiner

*Primary Examiner* — Bot Ledynh
(74) *Attorney, Agent, or Firm* — 24IP Law Group; Timothy R DeWitt (57) ABSTRACT

A method and apparatus for computing the angle ($\alpha$) of rotation of a rotational-angle sensor apparatus (10) with a first Hall measuring plate (20) and a second Hall measuring plate (30) which are arranged orthogonally to each other.

3 Claims, 5 Drawing Sheets

METHOD AND APPARATUS FOR COMPUTING AN ANGLE OF ROTATION

BACKGROUND OF THE INVENTION

Field of the Invention

The invention relates to a method for computing an angle of rotation of a rotational-angle sensor apparatus with a first Hall measuring plate and a second Hall measuring plate which are arranged substantially orthogonally to each other.

Brief Description of the Related Art

The measurement of the angle of rotation of a rotating element is important in many cases, for example in the electronic commutation of synchronous motors, in an automatic transmission or when the position of a steering wheel, a position of a gearshift lever or a position for the accelerator pedal or the clutch is measured, and for ascertaining the height of the chassis (for adjusting the headlights).

The control of the electronic commutation is effected, for example, by means of control signals with which semiconductor switches are switched for controlling the coil array in the synchronous motor. For this purpose, the changes in the control signals for the commutation are derived from the angle $\phi$ of rotation of the rotor, wherein for measuring the mechanical angle of rotation (also called position angle) a rotational-angle sensor apparatus is used. The used rotational-angle sensor apparatus comprises two Hall measuring plates which are ideally arranged orthogonally to each other. Such a rotational-angle sensor apparatus 10 is shown, for example, in FIG. 2 with a first Hall measuring plate 20 and a second Hall measuring plate 30. Such rotational-angle sensor apparatus are known, for example from the published German application no. DE 10 2010 031 813.

SUMMARY OF THE INVENTION

A method according to the invention for computing an angle of rotation includes the steps of measuring first Hall voltage values ($V_{HX}(t=0)$, $V_{HX}(t=1)$) at a first Hall measuring plate at a first time ($t=0$) and a second time ($t=1$), measuring second Hall voltage values ($V_{HZ}(t=0)$, $V_{HZ}(t=1)$) at a second Hall measuring plate at the first time ($t=0$) and the second time ($t=1$), computing the first nominal average value ($V_{HX}(t=0.5)$) of the first voltage value and the second nominal average value ($V_{HX}(t=0.5)$) of the second Hall voltage value; computing the first nominal angular value $\alpha(t=0)$ from the arctangent function of the first Hall voltage value $V_{HX}(t=0)$ and the second Hall voltage value $V_{HZ}(t=0)$ at a time $t=0$, computing the second nominal angular value $\alpha(t=1)$ from the arctangent function of the first Hall voltage value $V_{HX}(t=1)$ and the second Hall voltage value $V_{HZ}(t=1)$ at a time $t=1$, computing the nominal angle difference ($\Delta\alpha$) from the difference between the second nominal angular value $\alpha(t=1)$ and the first nominal angular value ($\alpha(t=0)$), computing the derivative of the first Hall voltage value by the difference $\Delta_{HX}$ between the measured first Hall voltage value $V_{HX}(t=0)$, $V_{HX}(t=1)$ at a first time ($t=0$) and the second time ($t=1$) and the nominal angle difference; computing the derivative of the second Hall voltage value by the difference $\Delta_{HZ}$ between the measured second Hall voltage value $V_{HZ}(t=0)$ $V_{HZ}(t=1)$ at a first time ($t=0$) and the second time ($t=1$) and the nominal angle difference ($\Delta\alpha$); computation of the angular value $\alpha$ by the following equation:

$$\alpha = \tan^{-1}\left(\frac{V_{HZ}(t=0.5) - \frac{\Delta V_{HX}}{\Delta\alpha}}{V_{HX}(t=0.5) + \frac{\Delta V_{HZ}}{\Delta\alpha}}\right)$$

BRIEF DESCRIPTION OF THE FIGURES

For a more complete understanding of the present invention and the advantages thereof, reference is now made to the following description and the accompanying drawings, in which:

FIG. 1B shows an ideal and two non-ideal characteristic lines of the Hall voltage $V_H$ against the magnetic flux of the Hall measuring plate in FIG. 1a;

DETAILED DESCRIPTION OF THE INVENTION

Figure 1A:
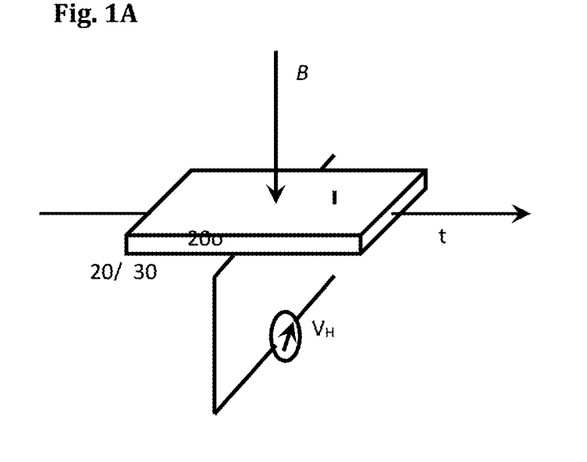
FIG. 1A shows a Hall measuring plate according to the state of the art.

FIG. 1A shows in detail one of the Hall measuring plates 20 (or 30) which use the Hall effect for determining the value of the magnetic flux B flowing through the Hall measuring plate 20. The Hall measuring plate 20 is supplied with a constant current I flowing through the Hall measuring plate 20 in the longitudinal direction. The magnetic flux B in this simplified representation extends perpendicularly to the surface 200 of the Hall measuring plate 20. A Hall voltage with a voltage value $V_H$, which depends on the orthogonal component of the magnetic flux B flowing, is measured in the plane of the surface 20o transversally to the direction of the current I. For the case that the magnetic field B rotates, the voltage value of the Hall voltage $V_H$ has a sinus shape in the ideal case.

However, the Hall voltage $V_H$ has an offset voltage $V_{OFF}$ for various reasons, i.e. a voltage will also be measured when the Hall measuring plate 20 is not subjected to a magnetic flux B. The real relationship between the magnetic field strength of the magnetic flux B and the measured voltage value $V_H$ is also not exactly linear either.

Figure 1B:
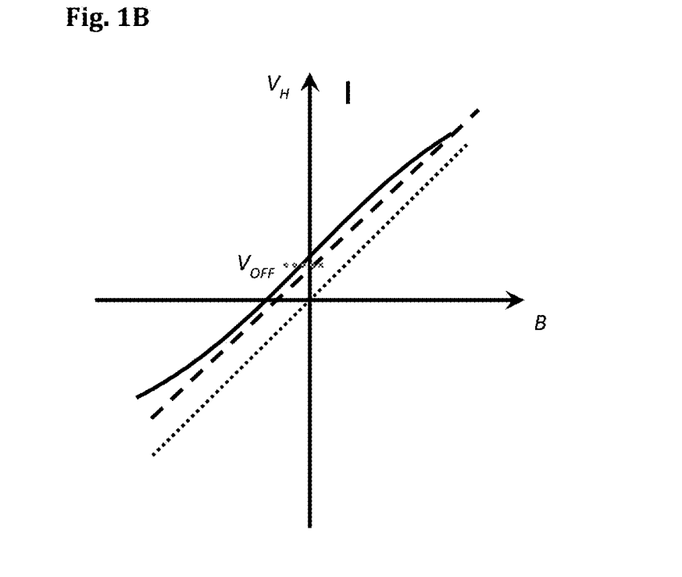

FIG. 1B shows an ideal and two non-ideal characteristic lines of the Hall measuring plate 20. The y axis shows the voltage value $V_H$ and the x axis shows the field strength of the magnetic flux B. The dotted line shows the ideal relationship between the Hall voltage $V_H$ and the strength of the magnetic field B. The dashed line shows an ideal characteristic line with an offset voltage $V_{OFF}$ and the continuous line shows the non-linearity of the characteristic line.

Figure 2:
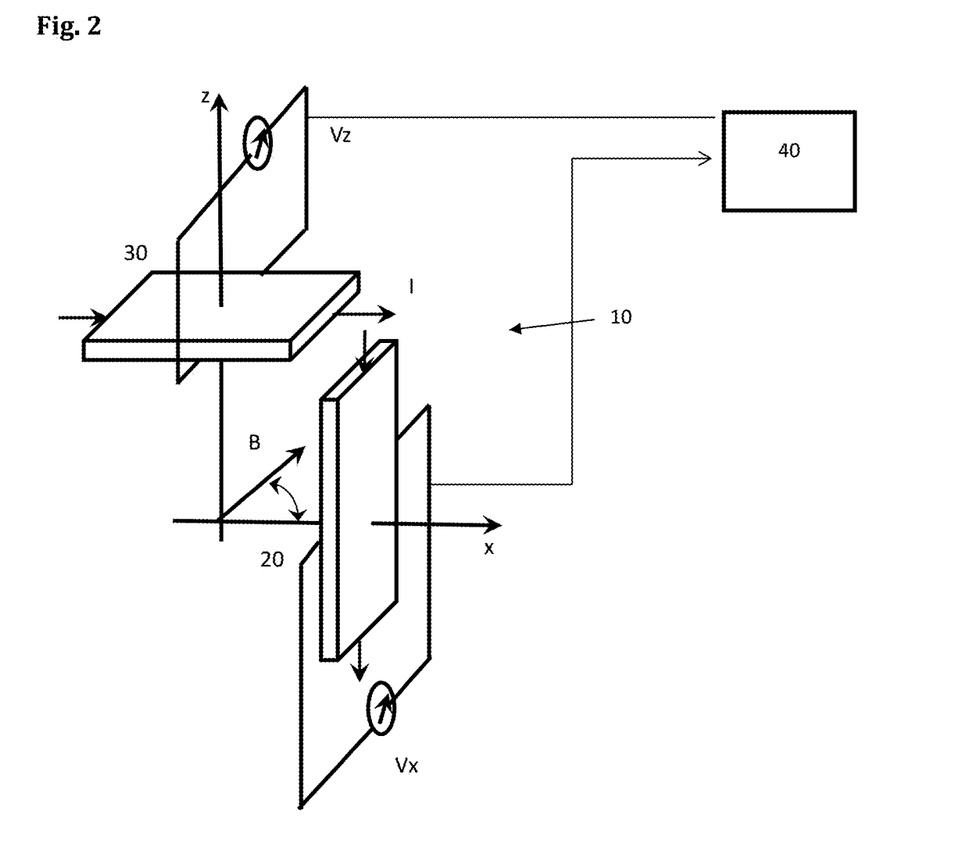
FIG. 2 shows two orthogonally arranged Hall measuring plates.

FIG. 2 shows a first Hall measuring plate 20 and a second Hall measuring plate 30 arranged substantially orthogonally to each other. Such apparatuses are used for ascertaining the magnetic flux B and thus for computing an angle $\alpha$ of rotation.

The direction of the magnetic flux B in FIG. 2 is neither perpendicular to the plane of the first Hall measuring plate 20 nor to the plane of the second Hall measuring plate 30. The magnetic flux B in this exemplary representation has a direction with an angle $\alpha$ to the x axis. In this exemplary coordinate system, the angle α is defined such that the angle α has a zero value in the x direction (plane of the second measuring plate 30).

The value of the first Hall voltage is dependent on the value of the perpendicular component $B_x$ of the magnetic field B through the second Hall measuring plate 20 and has a first voltage value $V_{HX}$. The value of the second Hall voltage is dependent on the value of the perpendicular component $B_z$ of the magnetic field B through the second Hall measuring plate 30 and has a second voltage value $V_{HZ}$. The first voltage value $V_{HX}$ and the second voltage value $V_{HZ}$ are measured continuously and stored in an evaluation unit 40.

The first Hall voltage $V_{HX}$ measured at the first Hall measuring plate 20 shows a cosine shape with respect to the angle α. The second Hall voltage $V_{HZ}$ measured at the second Hall measuring plate 30 shows a sinus shape with respect to the angle α. In an ideal situation the maximum values are constant for the first Hall voltage $V_{HX,MAX}$ and the second Hall voltage $V_{HX,MAX}$ for a certain magnetic field strength, a constant current value I and the same environmental conditions.

The value of the measured first Hall voltage $V_{HX}$ at a certain angle α is therefore ascertained by the following equation:

$$V_{HX} = V_{HX,MAX} \cos \alpha \quad (1).$$

In a similar manner, the measured value of the second Hall voltage $V_{HZ}$ for the same angle α is specified by the following equation:

$$V_{HZ} = V_{HZ,MAX} \sin \alpha \quad (2).$$

The cosine value of the angle α is therefore specified by the following equation:

$$\frac{V_{HX}}{V_{HX,MAX}} = \cos \alpha \quad (3)$$

and the sinus value of the angle α by the following equation:

$$\frac{V_{HZ}}{V_{HZ,MAX}} = \sin \alpha. \quad (4)$$

This yields:

$$\frac{\sin \alpha}{\cos \alpha} = \frac{\frac{V_{HZ}}{V_{HZ,MAX}}}{\frac{V_{HX}}{V_{HX,MAX}}}. \quad (5)$$

Assuming the same maximum value of the first Hall voltage and the second Hall voltage, i.e.

$$V_{HX,MAX} = V_{HZ,MAX} \quad (6)$$

this yields:

$$\tan \alpha = \frac{V_{HZ}}{V_{HX}} \quad (7)$$

and by the inverse tangent (arctangent):

$$\alpha = \tan^{-1}\left(\frac{V_{HZ}}{V_{HX}}\right). \quad (8)$$

Assuming that the first Hall voltage $V_{HX}$ and the second Hall voltage $V_{HZ}$ each have offset voltages $V_{HX,ERR}$ and $V_{HZ,ERR}$ in the respective axis, the following equation are applicable:

$$V_{HX} = V_{HX,MAX} \cos \alpha + V_{HX,ERR} \quad (9)$$

$$V_{HZ} = V_{HZ,MAX} \sin \alpha + V_{HZ,ERR} \quad (10).$$

It is also known that the first Hall measuring plate 20 and the second Hall measuring plate 30 have a small degree of sensitivity in a direction which is orthogonal to the actual main direction of sensitivity, which leads to an error angle β in the computation of the angle of rotation. This error angle β can also encompass inaccuracies in the mechanical positions of the first Hall measuring plate 20 and the second Hall measuring plate 30. The first Hall voltage $V_{HX}$ is thus ascertained by:

$$V_{HX} = V_{HX,MAX} \cdot \cos\left(\alpha + \frac{\beta}{2}\right) + V_{HX,ERR} \quad (11)$$

and the second Hall voltage $V_{HZ}$ by:

$$V_{HZ} = V_{HZ,MAX} \cdot \sin\left(\alpha - \frac{\beta}{2}\right) + V_{HZ,ERR}. \quad (12)$$

It has to be taken into account that respectively one half of the error angle β is allocated to each of the two axes.

It is likewise known that the first Hall measuring plate 20 and the second Hall measuring plate 30 can have different sensitivities, leading to a so-called gain error $G_{ERR}$:

$$G_{ERR} = 1 - \frac{V_{HX,MAX}}{V_{HZ,MAX}}. \quad (13)$$

Figure 3:
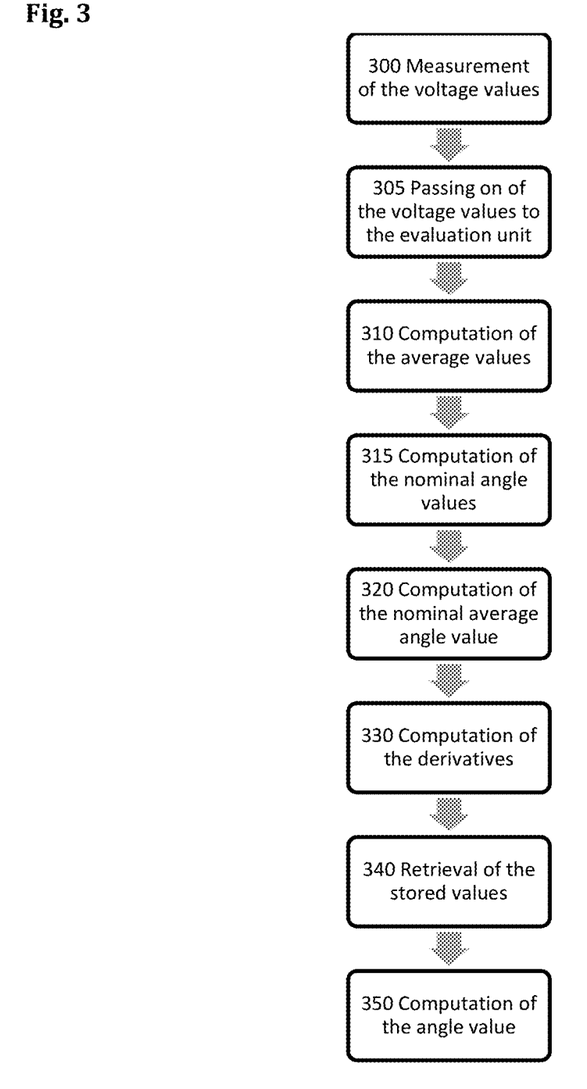
FIG. 3 shows the sequence of the method of the invention.

The method of the invention for computing the angle α of rotation is shown in FIG. 3. The method includes in step 300 measuring two temporally different voltage values at the first Hall measuring plate 20 $V_{HX}(t=0)$ and $V_{HX}(t=1)$ and at the second Hall measuring plate 30 $V_{HZ}(t=0)$ and $V_{HZ}(t=1)$. The time difference t between the measurement of the two voltage values is, for example, in the range of a few milliseconds to several hundreds of milliseconds. At a scanning rate of a few kHz in an A/D converter therefore the time intervals between two measured values are in a range of a few 100 µs. These time specifications are merely exemplary, dependent on the application, and do not limit the invention. These measured voltage values are passed on to the evaluation unit 40 in step 305. For reducing the influence of errors, it is required to offset two different values with an angle difference of 5-10° or larger. If the two consecutively measured voltage values are identical, i.e. $V_{HX}(t=0)=V_{HX}(t=1)$ and $V_{HZ}(t=0)=V_{HZ}(t=1)$, a correction of the computation of the angle α of rotation is not required, since the angle has not changed.

In most cases, however, there are different voltage values, i.e. $V_{HX}(t=0) \neq V_{HX}(t=1)$ and $V_{HZ}(t=0) \neq V_{HZ}(t=1)$, and the angle α of rotation has to be computed. In a subsequent step 310 average values are computed in each case in the evaluation unit 40 for the first Hall voltage $V_{HX}(t=0.5)$ and for the second Hall voltage $V_{HZ}(t=0.5)$ by the following equations:

$$V_{HX}(t=0.5) = \frac{(V_{HX}(t=0) + V_{HX}(t=1))}{2} \tag{14}$$

$$V_{HZ}(t=0.5) = \frac{(V_{HZ}(t=0) + V_{HZ}(t=1))}{2}. \tag{15}$$

In the step 315 also the nominal angular values $\alpha(t=0)$ and $\alpha(t=1)$ for the first measurement of the voltage values at $t=0$ and for the second measurement of the voltage values at $t=1$ are measured as follows:

$$\alpha(t=0) = \tan^{-1}\left(\frac{V_{HZ}(t=0)}{V_{HX}(t=0)}\right) \tag{16}$$

$$\alpha(t=1) = \tan^{-1}\left(\frac{V_{HZ}(t=1)}{V_{HX}(t=1)}\right). \tag{17}$$

A nominal average angular value $\alpha(t=0.5)$ is computed in step 320 with the aid of the inverse tangent (arctangent) function as follows:

$$\alpha(t=0.5) = \tan^{-1}\left(\frac{V_{HZ}(t=0) + V_{HZ}(t=1)}{V_{HX}(t=0) + V_{HX}(t=1)}\right) = \tan^{-1}\left(\frac{V_{HZ}(t=0.5)}{V_{HX}(t=0.5)}\right). \tag{18}$$

In the subsequent step 330 the derivatives of the first Hall voltage $$\frac{\Delta V_{HX}}{\Delta \alpha}$$

and of the second Hall voltage $$\frac{\Delta V_{HZ}}{\Delta \alpha}$$

are computed as follows:

$$\frac{\Delta V_{HX}}{\Delta \alpha} = \frac{V_{HX}(t=1) - V_{HX}(t=0)}{\alpha(t=1) - \alpha(t=0)} \tag{19}$$

$$\frac{\Delta V_{HZ}}{\Delta \alpha} = \frac{V_{HZ}(t=1) - V_{HZ}(t=0)}{\alpha(t=1) - \alpha(t=0)}. \tag{20}$$

The values for this computation are stored and can be queried in the evaluation unit 40 in step 340. The angle α of rotation is subsequently computed in step 350 from the nominal angular value α (t=0.5) in equation 16 with a correction factor computed from the derivatives (equations 19 and 20).

$$\alpha = \tan^{-1}\left(\frac{V_{HZ}(t=0.5) - \frac{\Delta V_{HX}}{\Delta \alpha}}{V_{HX}(t=0.5) + \frac{\Delta V_{HZ}}{\Delta \alpha}}\right) \tag{19}$$

As can be seen here, the equation (19) for computing the angle α of rotation does not contain any components with a time dependence. Values of time are consequently irrelevant for carrying out the method. By calculation of the derivative with respect to an angular value, the errors caused by the offset voltage are reduced by half and errors due to amplifier error (gain error) and phase errors are substantially eliminated.

The method is carried out with the aid of a computer program in the evaluation unit 40.

EXEMPLARY EMBODIMENTS

Figure 4:
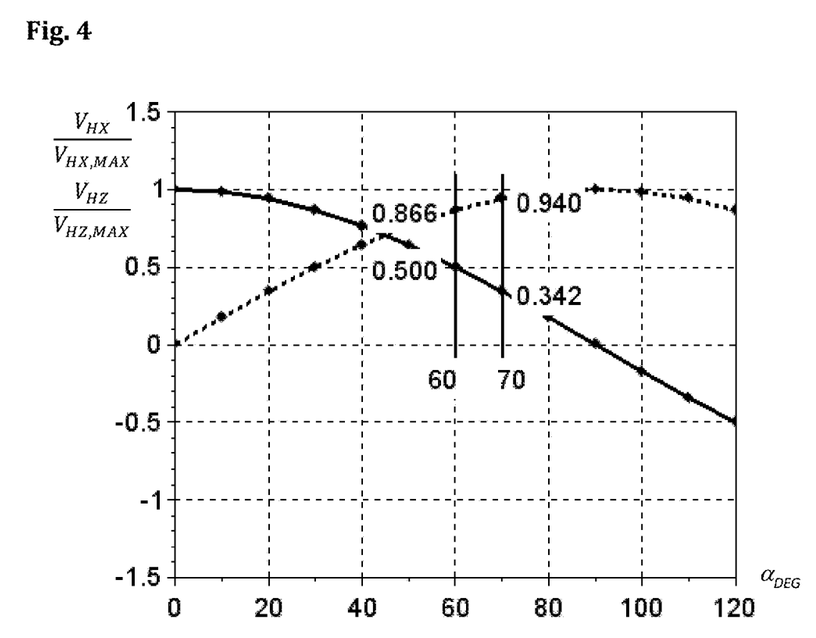
FIG. 4 shows the nominal measured values of the method of the invention for the ideal case.

FIG. 4 shows the nominal measured values of the Hall voltages for different angles in the ideal case without errors.

In this (comparative) example the voltage value $V_{HX}$ at a time $t=0$ has the value 0.500 and the voltage value $V_{HZ}$ in the z direction at $t=0$ a value of 0.866. It can also be seen in FIG. 4 that the voltage value of the first Hall voltage at a time $t=1$ has the following value $V_{HX}(1)=0.342$ and the second Hall voltage has $V_{HZ}(1)=0.940$.

This yields the angular value α at $t=0$ as follows:

$$\alpha(0) = \tan^{-1}\left(\frac{V_{HZ}(0)}{V_{HX}(0)}\right) = \tan^{-1}\left(\frac{0.866}{0.500}\right) = 60° \tag{A}$$

and at $t=1$:

$$\alpha(1) = \tan^{-1}\left(\frac{V_{HZ}(1)}{V_{HX}(1)}\right) = \tan^{-1}\left(\frac{0.940}{0.342}\right) = 70°. \tag{B}$$

The average angular values can be computed as follows:

$$V_{HX}(0.5) = \frac{V_{HX}(0) + V_{HX}(1)}{2} = \frac{0.500 + 0.342}{2} = 0.421 \tag{C}$$

$$V_{HZ}(0.5) = \frac{V_{HZ}(0) + V_{HZ}(1)}{2} = \frac{0.866 + 0.940}{2} = 0.903 \tag{D}$$

and the nominal average angular value of the angle α (t=0.5) is consequently:

$$\alpha(0.5) = \tan^{-1}\left(\frac{V_{HZ}(0.5)}{V_{HX}(0.5)}\right) = \tan^{-1}\left(\frac{0.903}{0.421}\right) = 65° \tag{E}$$

The derivative is formed as follows:

$$\frac{\Delta V_{HX}}{\Delta \alpha} = \frac{360°}{2\pi} \cdot \frac{V_{HX}(1) - V_{HX}(0)}{\alpha(1) - \alpha(0)} = \frac{360°}{2\pi} \cdot \frac{0.342 - 0.500}{70° - 60°} = -0.905 \tag{F}$$

$$\frac{\Delta V_{HZ}}{\Delta \alpha} = \frac{360°}{2\pi} \cdot \frac{V_{HZ}(1) - V_{HZ}(0)}{\alpha(1) - \alpha(0)} = \frac{360°}{2\pi} \cdot \frac{0.940 - 0.866}{70° - 60°} = 0.423. \tag{G}$$

Consequently, the angular value α results as follows:

$$\alpha(0.5) = \tan^{-1}\left(\frac{V_{HZ}(0.5) - \frac{\Delta V_{HX}}{\Delta \alpha}}{V_{HX}(0.5) + \frac{\Delta V_{HX}}{\Delta \alpha}}\right) = \tan^{-1}\left(\frac{0.903 - (-0.905)}{0.421 + 0.423}\right) = 65°. \quad (H)$$

The value of the angle α of rotation is as a result identical from both computations (equations E and H), which would be expected, since this is an ideal case.

Example 2

Figure 5:
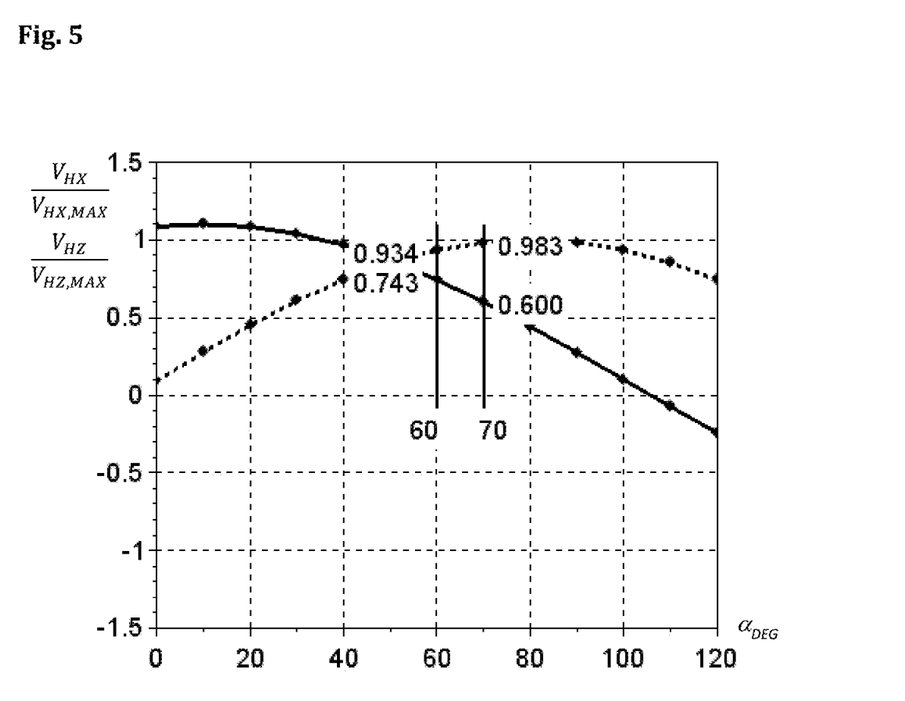
FIG. 5 shows the nominal measured values of the method of the invention for the real case.

In the following second example the Hall voltage is computed with a gain (−10%), phase (−20%) and offset error (+10% on the x axis and −10% on the y axis). Let us assume that the actual value for the angle of rotation is α=65°, like in example 1.

From FIG. 5 we read the following voltage values $V_{HZ}(0)=0.934$, $V_{HZ}(1)=0.983$, $V_{HX}(0)=0.734$ and $V_{HX}(1)=0.600$. The nominal angular values α(t=0) at t=0 and α(t=1) at t=1 can then be computed using the equation (8) as follows:

$$\alpha(t=0) = \tan^{-1}\left(\frac{V_{HZ}(0)}{V_{HX}(0)}\right) = \tan^{-1}\left(\frac{0.934}{0.743}\right) = 51.5° \quad (J)$$

$$\alpha(t=1) = \tan^{-1}\left(\frac{V_{HZ}(1)}{V_{HX}(1)}\right) = \tan^{-1}\left(\frac{0.983}{0.600}\right) = 58.6° \quad (K)$$

The difference between the nominal angular values α(t=0) and α(t=1) is therefore Δα=58.6°−51.5°=7.1°.

The average values $V_{HX}(0.5)$ and $V_{HZ}(0.5)$ are computed as follows:

$$V_{HX}(0.5) = \frac{V_{HX}(0) + V_{HX}(1)}{2} = \frac{0.743 + 0.600}{2} = 0.6715 \quad (L)$$

$$V_{HZ}(0.5) = \frac{V_{HZ}(0) + V_{HZ}(1)}{2} = \frac{0.934 + 0.983}{2} = 0.9585 \quad (M)$$

With these average values the computed value for the angle α of rotation would therefore be:

$$\alpha(0.5) = \tan^{-1}\left(\frac{V_{HZ}(0.5)}{V_{HX}(0.5)}\right) = \tan^{-1}\left(\frac{0.9585}{0.6715}\right) = 55.0° \quad (N)$$

However, by using the method of the invention, the following value is computed for the angle α of rotation:

$$\frac{\Delta V_{HX}}{\Delta \alpha} = \frac{360°}{2\pi} \cdot \frac{V_{HX}(1) - V_{HX}(0)}{\alpha(1) - \alpha(0)} = \frac{360°}{2\pi} \cdot \frac{0.600 - 0.743}{58.6° - 51.5°} = -1.154 \quad (P)$$

$$\frac{\Delta V_{HZ}}{\Delta \alpha} = \frac{360°}{2\pi} \cdot \frac{V_{HZ}(1) - V_{HZ}(0)}{\alpha(1) - \alpha(0)} = \frac{360°}{2\pi} \cdot \frac{0.983 - 0.934}{58.6° - 51.1°} = 0.395 \quad (R)$$

$$\alpha(0.5) = \quad (S)$$
$$\tan^{-1}\left(\frac{V_{HZ}(0.5) - \frac{\Delta V_{HX}}{\Delta \alpha}}{V_{HX}(0.5) + \frac{\Delta V_{HZ}}{\Delta \alpha}}\right) = \tan^{-1}\left(\frac{0.9585 - (-1.154)}{0.6715 + 0.395}\right) = 63.2°$$

As can be seen in the first comparative example, the ideal angle α is 65°. An erroneous computation in accordance with the equation (N) leads to a computed angular value of 55°. The computation in accordance with the method of this patent application yields a value of 63.2°. This is a deviation from the ideal angular value by merely 1.8°.

LIST OF REFERENCE NUMBERS

10 rotational-angle sensor arrangement
20 first Hall measuring plate
20o surface
30 second Hall measuring plate
40 evaluation unit

What is claimed is:

1. A method for computing the angle of rotation of a rotational-angle sensor apparatus with a first Hall measuring plate and a second Hall measuring plate, comprising the steps of:
    measuring first Hall voltage values ($V_{HX}$(t=0), $V_{HX}$(t=1)) at the first Hall measuring plate at a first time and a second time;
    measuring second Hall voltage values ($V_{HZ}$(t=0), $V_{HZ}$(t=1)) at the second Hall measuring plate at the first time (t=0) and the second time (t=1);
    computing the first nominal average value ($V_{HX}$(t=0.5)) of the first voltage value and of the second nominal average value ($V_{HY}$(t=0.5)) of the second Hall voltage value;
    computing the first nominal angular value α(t=0) from the arctangent function of the first Hall voltage value $V_{HX}$(t=0) and the second Hall voltage value $V_{HZ}$(t=0) at a time t=0;
    computing the second nominal angular value α(t=1) from the arctangent function of the first Hall voltage value $V_{HX}$(t=1) and the second Hall voltage value $V_{HZ}$(t=1) at a time t=1;
    computing the nominal angle difference (Δα) from the difference between the second nominal angular value (α(t=1)) and the first nominal angular value (α(t=0));
    computing the derivative of the first Hall voltage value by the difference $\Delta_{HX}$ between the measured first Hall voltage value ($V_{HX}$(t=0), $V_{HX}$(t=1)) at a first time (t=0) and the second time (t=1) and the nominal angle difference;
    computing the derivative of the second Hall voltage value by the difference $\Delta_{HZ}$ between the measured second Hall voltage value ($V_{HZ}$(t=0), $V_{HZ}$(t=1)) at a first time (t=0) and the second time (t=1) and the nominal angle difference (Δα);
    computing the angular value α by the following equation:

$$\alpha = \tan^{-1}\left(\frac{V_{HZ}(t=0.5) - \frac{\Delta V_{HX}}{\Delta \alpha}}{V_{HX}(t=0.5) + \frac{\Delta V_{HZ}}{\Delta \alpha}}\right).$$

2. A rotational-angle sensor arrangement, including:
- a first Hall measuring plate for measuring a first Hall voltage;
- a second Hall measuring plate for measuring a second Hall voltage arranged substantially orthogonally to the first Hall measuring plate; and
- an evaluation unit for carrying out the method according to claim 1.

3. The method according to claim 1, wherein the angle of rotation is measured to enable at least one of an electronic commutation of synchronous motors, an automatic transmission, measurement of a position of a steering wheel, a position of a gearshift lever, a pedal position for an accelerator or a clutch or for ascertaining the height of the chassis.

* * * * *